(12) United States Patent
Barnes et al.

(10) Patent No.: US 8,459,589 B2
(45) Date of Patent: Jun. 11, 2013

(54) EXTERNAL PRESSURIZATION SYSTEM FOR LIGHTER THAN AIR VEHICLES

(75) Inventors: Nicholas L. Barnes, North Canton, OH (US); Jonathan M. Peritt, Clinton, OH (US)

(73) Assignee: Lockheed Martin Corporation, Bethesda, MD (US)

( * ) Notice: Subject to any disclaimer, the term of this patent is extended or adjusted under 35 U.S.C. 154(b) by 424 days.

(21) Appl. No.: 12/466,664

(22) Filed: May 15, 2009

(65) Prior Publication Data
US 2010/0288875 A1    Nov. 18, 2010

(51) Int. Cl.
*B64B 1/62* (2006.01)
*B64B 1/60* (2006.01)

(52) U.S. Cl.
USPC ............................ 244/98; 244/99; 244/128

(58) Field of Classification Search
USPC .............................................. 244/98, 99, 128
See application file for complete search history.

(56) References Cited

U.S. PATENT DOCUMENTS

| | | | |
|---|---|---|---|
| 1,475,210 A | 11/1923 | Upson | |
| 1,580,004 A | 4/1926 | Bradford | |
| 1,797,502 A | 3/1931 | Hall | |
| 1,834,614 A * | 12/1931 | Hall | 244/97 |
| 2,331,404 A * | 10/1943 | Liebert | 244/30 |
| 2,428,656 A * | 10/1947 | Elliott et al. | 244/128 |
| 3,432,122 A * | 3/1969 | Ross et al. | 244/31 |
| 3,456,903 A * | 7/1969 | Papst | 244/99 |
| 5,143,322 A | 9/1992 | Mason | |
| 5,240,206 A * | 8/1993 | Omiya | 244/96 |
| 5,333,817 A * | 8/1994 | Kalisz et al. | 244/98 |
| 5,368,256 A * | 11/1994 | Kalisz et al. | 244/96 |
| 5,449,129 A * | 9/1995 | Carlile et al. | 244/26 |
| 5,538,203 A * | 7/1996 | Mellady | 244/98 |
| 6,914,021 B2 | 7/2005 | Sidwell | |
| 6,966,523 B2 * | 11/2005 | Colting | 244/30 |
| 7,055,777 B2 * | 6/2006 | Colting | 244/30 |
| 7,303,166 B2 * | 12/2007 | Geery | 244/30 |
| 7,500,637 B2 * | 3/2009 | Marimon et al. | 244/128 |
| 7,552,893 B2 * | 6/2009 | Colting | 244/128 |
| 7,568,656 B2 * | 8/2009 | Handley | 244/98 |
| 7,871,035 B2 * | 1/2011 | Arel | 244/98 |
| 2007/0075186 A1 * | 4/2007 | Marimon et al. | 244/125 |
| 2009/0072082 A1 * | 3/2009 | Arel | 244/97 |

FOREIGN PATENT DOCUMENTS

GB        2393171        9/2002

\* cited by examiner

*Primary Examiner* — Michael Carone
*Assistant Examiner* — Steven Hawk
(74) *Attorney, Agent, or Firm* — Renner Kenner Greive Bobak Taylor & Weber

(57) ABSTRACT

An airship system, including an inflatable airship of predetermined volume adapted to be filled with gas and to rise to a predetermined altitude, said airship having a hull formed from an inflated flexible gas containment primary envelope, at least one lifting envelope located within the primary envelope for containing the lifting gas, where the lifting envelope will expand to substantially occupy the space of the primary envelope when the airship is at its predetermined high altitude, at least one secondary envelope located within the primary envelope, which can be inflated when said lifting envelope is at lower altitudes to fill the balance of the space of the primary envelope, and air handling means external to the primary envelope and communicating with the secondary envelope for filling and emptying the secondary envelope.

5 Claims, 5 Drawing Sheets

EXTERNAL PRESSURIZATION SYSTEM FOR LIGHTER THAN AIR VEHICLES

BACKGROUND OF THE INVENTION

The present invention is related to lighter than air (LTA) vehicles and an external system for pressurization of the LTA vehicles. More specifically, the present invention relates to LTA's having at lease one lifting gas cell and at least one air cell, and the means for filling the air cell.

One of the major problems with non-rigid lighter-than-air vehicles is keeping the bag from bursting as the ambient pressure decreases with altitude or from collapsing when descending from altitude. One method of preventing such events is to incorporate envelopes or ballonets in the vehicle, which are inflatable gas bags within the Helium bag. The vehicle is designed to fly with partially inflated ballonets that can be inflated with air, causing the Helium volume to contract or, deflated, causing the Helium volume to expand. Thus, at altitude, the ballonets may be almost collapsed, providing the necessary "room" for the Helium to expand as ambient air pressure has decreased. As the vehicle descends into denser atmosphere, the ballonets are inflated to insure that the Helium gas bag does not collapse or even locally sag. Additionally, ballonets can play a roll in altitude control. An example of ballonets installed on a lighter-than-air vehicle can be found in U.S. Pat. No. 5,143,322 to E. W. Mason.

Prior art methods of pressurizing and filling the ballonets typically involved the use of ram air scoops. Examples of this type system can be found in U.S. Pat. No. 1,475,210 to R. H. Upson and U.S. Pat. No. 2,331,404 to H. R. Liebert.

In U.S. Pat. No. 1,580,004 to A. Bradford and U.S. Pat. No. 1,797,502 to C. S. Hall separate pumps are used for pressurizing the ballonets. Additionally, the Hall design provide heaters to heat the pressurized air. Since the ballonet is located in the middle of the main Helium filled gas bag, heating of the Helium could also be accomplished. The problem with these designs is that the ballonets are located centrally and fill valves and lines are, necessarily, co-located. Thus they are difficult to reach for maintenance and repair or removal. Additionally, the need for such fill valves and lines add weight.

U.S. Pat. No. 5,333,817 to J. B. Kalisz, et. al. teaches a ballonet system for a lighter-than-air-vehicle that includes the ballonet system includes a plurality of ballonets located within the gas bag positioned along the longitudinal axis and on each side of the vertical axis of the vehicle. Each of the ballonets include a flexible sheet joined at its periphery thereof to a portion of the wall of the gas bag. A ballonet pressurization system is coupled to each ballonet for pressurizing them with air that includes the portion of the wall of the gas bag forming the ballonet having a plurality of holes there through. A manifold having an inlet port is joined to the wall covering the holes therein and is adapted to diffuse the pressurized air entering therein. Also included is at least one fan having an inlet port coupled to ambient atmosphere and an outlet port coupled to the inlet port of the manifold for providing pressurized air to the interior thereof. A check valve located in the outlet port of the fan is provided for preventing air from flowing from the interior of the manifold out the inlet port of the fan. A ballonet venting system is included for venting the interior of the ballonet to ambient atmosphere. However, it does not provide for very rapid deflation of the ballonet.

Airships, including those that attain high altitude, where high altitude is generally being considered 40,000 ft and above, utilizing conventional methods suffer from several drawbacks. For example, the ballonets are made from a flexible, impermeable material that are attached to the interior of the envelope of the airship, and are utilized to store and separate air from the helium held within the remaining portion of the envelope. As the airship ascends to altitude, the air stored in each ballonet is exhausted through a number of valve/blowers, causing the ballonets to deflate. The helium within the envelope expands while the airship ascends to the desired altitude. It will be appreciated that expansion of the helium also forces air out of the ballonets. order to maintain pressure during descent, air is forced back into each ballonet using the valve/blowers causing the ballonets to inflate. Thus, it should be clear that the material comprising the ballonets traverses, or moves from a deflated condition to an inflated condition as air is blown into the ballonets. Likewise, the material comprising the ballonets moves from an inflated to a deflated condition as air is pushed out of the ballonets.

For high altitude airships, which are structures that resemble conventional airships, but may be significantly larger, the hull or envelope of a high altitude airship may comprise a volume of several million cubic feet. Due to the large variation in pressure and temperature that occurs as the high altitude airship moves from ground to high altitude and vice versa, it is required that the helium within the high altitude airship expand to a greater degree than that required by conventional airships. Additionally, a high altitude airship requires that a larger amount of air be expelled from its envelope than that of conventional airships. As such, to ascend the high altitude airship to a high altitude, large ballonets would be required to accommodate the large quantity of lifting gas expansion that would occur within the envelope of the high altitude airship. Utilizing large ballonets, however, is impractical for high altitude airships because the added weight would act to impede the attainment of high altitudes. Furthermore, because of the increased amount of material needed for the ballonets of a high altitude airship, significant bunching and twisting of the ballonet material would result when the ballonets are deflated, thus leading to an imbalanced condition within the envelope. The balance of the high altitude airship would be further hampered as the lifting gas would be free to accumulate in any region within the hull or envelope of the airship making it difficult to maintain control of the airship. For example, if the lifting gas accumulates toward the aft portion of the airship, this would cause the airship to become nose heavy, making it difficult to fly or to ascend.

US Patent Publication No. US 2007/0075186 to Marimon et al teaches a lifting gas cell system that provides a plurality of cells to distribute the lifting gas evenly along the length of the hull of the airship, to maintain the balance, stability, and control of the airship. Marimon does not show the blowers and valves for filling and emptying the cells, but suggests that it is part of the airship envelope.

Thus, there is a need for a lifting gas cell system that can accommodate the large expansion and contraction of the lifting gas that will occur inside an airship. Additionally, there is a need for a lifting gas cell system for an airship that is lightweight.

SUMMARY OF THE INVENTION

The present invention is directed to an airship system, including an inflatable airship of predetermined volume adapted to be filled with gas and to rise to a predetermined altitude, said airship having a hull formed from an inflated flexible gas containment primary envelope, at least one lifting envelope located within the primary envelope for containing the lifting gas, where the lifting envelope will expand to substantially occupy the space of the primary envelope when the airship is at its predetermined altitude, at least one secondary envelope located within the primary envelope, which can be inflated when said lifting envelope is at lower altitudes to fill the balance of the space of the primary envelope, and air handling means external to the primary envelope and communicating with the secondary envelope for filling and emptying the secondary envelope.

The present system provides a means for isolating selected air handling equipment from the helium barrier, i.e., the lifting envelope or ballonet, while maintaining airflow between equipment and inside of the envelope. The present invention provides a lighter solution than attaching air handling equipment directly to the main envelope or hull and protecting them from the helium barrier material with a cage by housing selected air handling equipment in an external envelope.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE INVENTION

The present invention is directed to an airship or a lighter-than-air-vehicle having a lift producing gas bag or envelope and secondary envelope which will be filled with air at lower altitudes by a novel filling and emptying means.

The airship or vehicle 100 includes a hull 102 formed from an inflated flexible gas containment primary envelope. The hull includes a longitudinal axis, vertical axis and lateral axis. The vehicle 100, as shown, is a non-rigid design. But, the present invention could be used on rigid designs as well. Thus the vehicle depicted is for purposes of illustration only.

The hull is composed of multi-layers of materials such as Aramid fiber cloth and neoprene rubber, although other materials can be employed. The flexible material of the hull is made to withstand operation at high altitudes and exposure to elements associated with the altitude and the environment. Such materials are known in the art. See for example, U.S. Pat. No. 6,914,021, the teachings of which are incorporated herein by reference and which also teaches a vehicle having a plurality of propulsion systems 103 mounted thereon. The hull envelope can be supported by various types of structural elements or by the cells which will be discussed further hereinafter.

Figure 2:
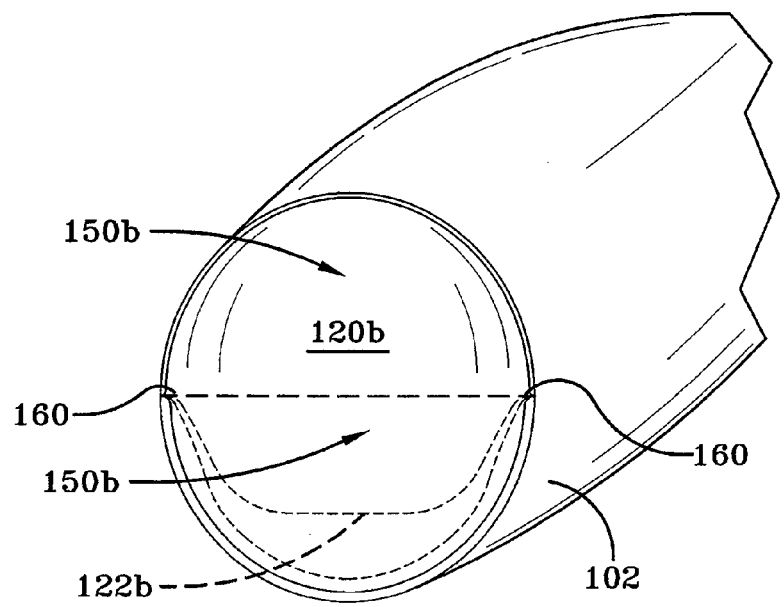
FIG. 2 is a cross-sectional view of the LTA vehicle of FIG. 1.
Figure 4:
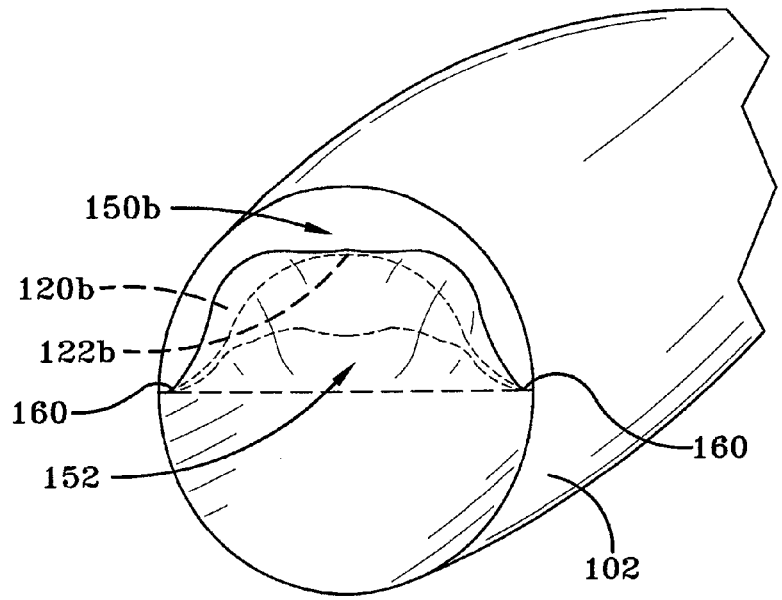
FIG. 4 is a cross-sectional view of the LTA vehicle of FIG. 3.
Figure 3:
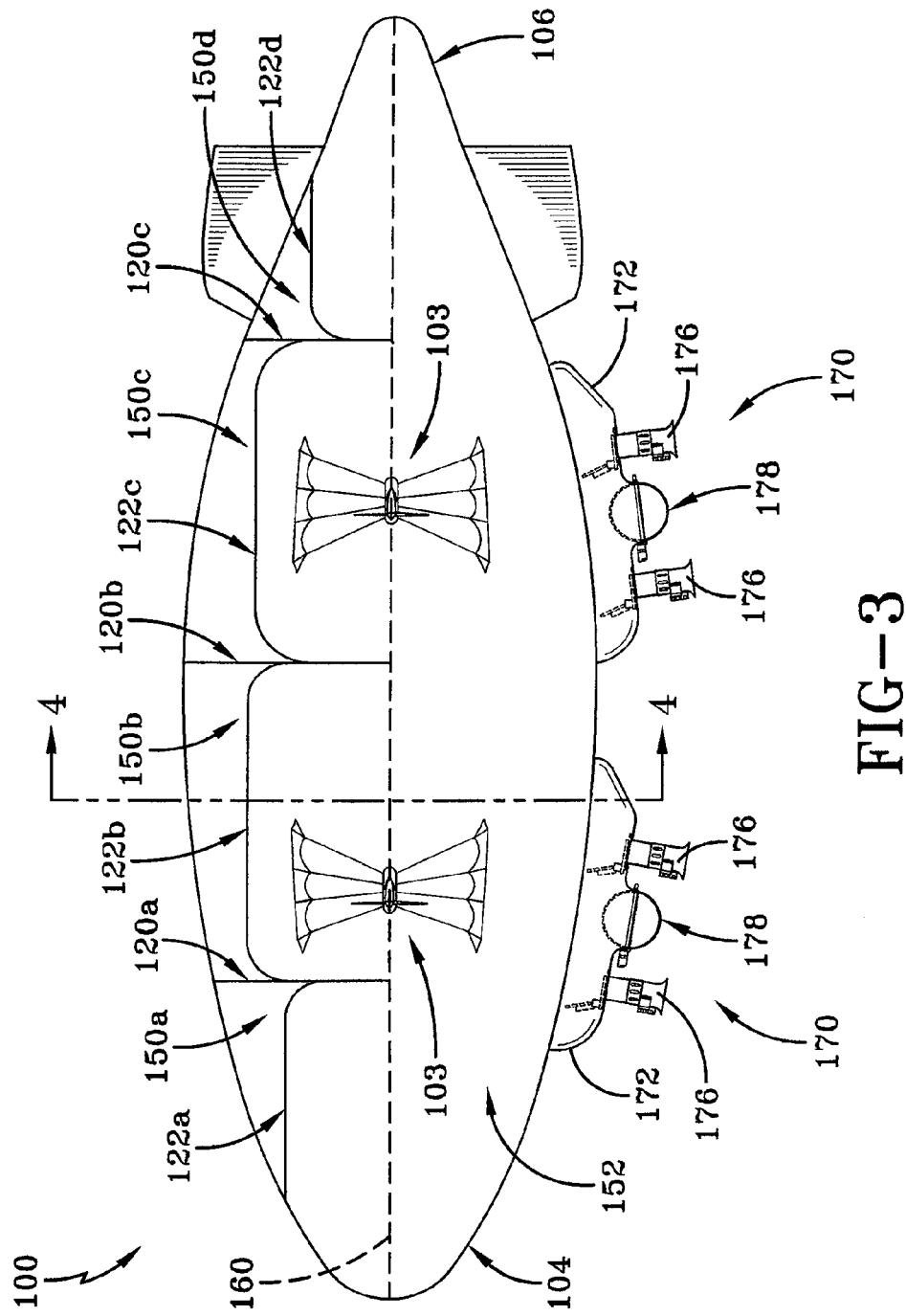
FIG. 3 shows an elevational view of the LTA vehicle in FIG. 1 where the air cells are inflated.
Figure 5:
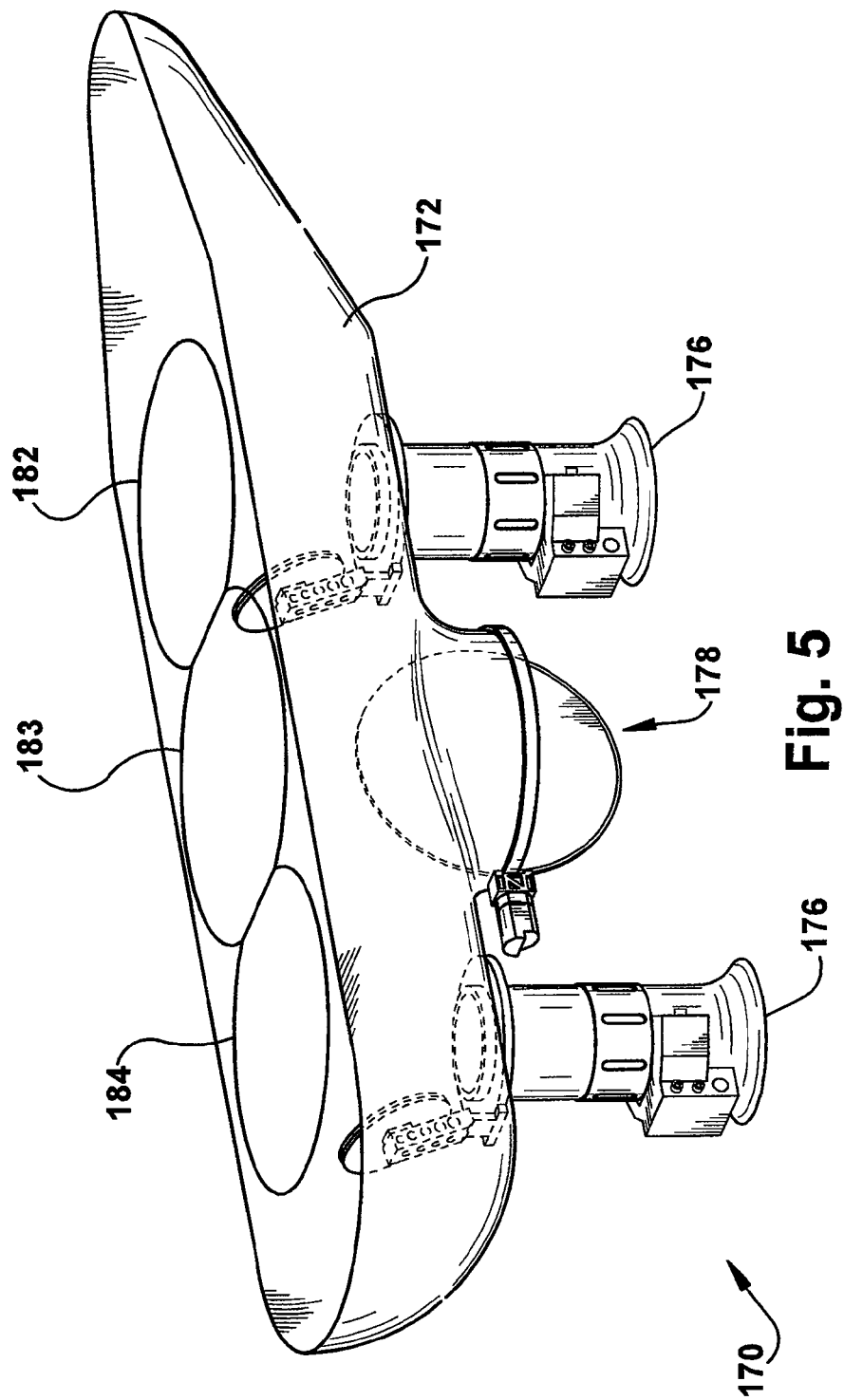
FIG. 5 is a perspective view of the filling and emptying means of the present invention.
Figure 8:
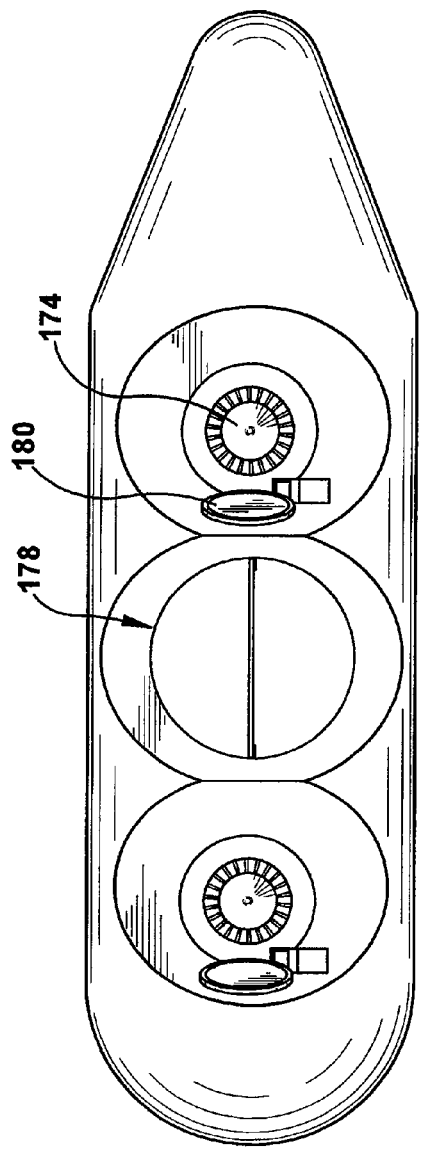
FIG. 8 is a top view of the filling and emptying means of FIG. 5.
Figure 6:
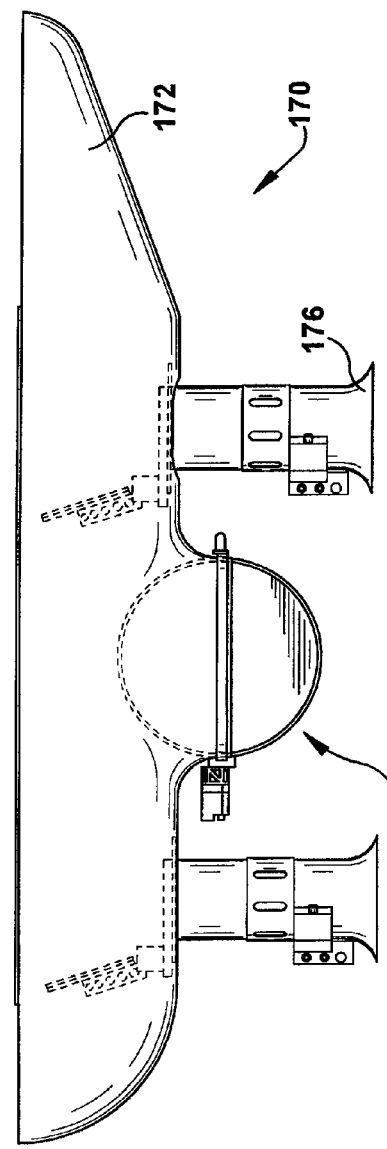
FIG. 6 is an elevational view of the air cell filling and emptying means of FIG. 5.
Figure 7:
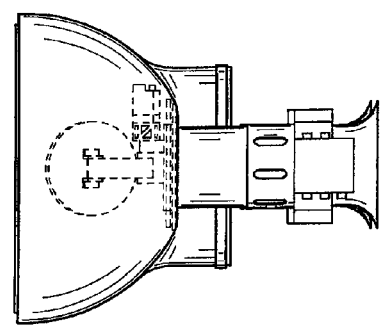
FIG. 7 is a end view of the filling and emptying means of FIG. 5.

Disposed within the hull 102, for purposes of illustration, is a series of lifting gas envelopes 150a-d. Although the invention could be applied to an LTA having one lifting gas envelope, it will be discussed using more than one lifting gas envelope. As illustrated, from the nose 104 to the tail 106, are a plurality of envelopes or ballonets 150 containing the lifting gas, which are located throughout the length of the hull. Each ballonet is formed from a flexible sheet 122. As seen in FIGS. 2, 3, and 4, the envelopes 150a-d are illustrated in various stages of inflation or deflation.

Optionally, the system can have at least one partition 120 having a partition outer edge attached anywhere along a portion of the width orientation and a partition inner edge, so that the at least two diaphragms having opposed diaphragm outer edges connected to one another by opposed diaphragm inner edges, wherein the diaphragm outer edges are attached anywhere along the length orientation, and the diaphragm inner edges are attached to the partition inner edges.

The air envelope 152, which in the present illustrations will constitute the balance of the hull 102 not occupied by the lifting gas envelopes 150a-d, will be filled and emptied via an air handling system 170, which includes a means for filling the air envelope and a valve means for emptying out the air envelope. Further, the air envelope could also be a separate envelope or ballonet similar to the lifting gas envelope.

Figure 1:
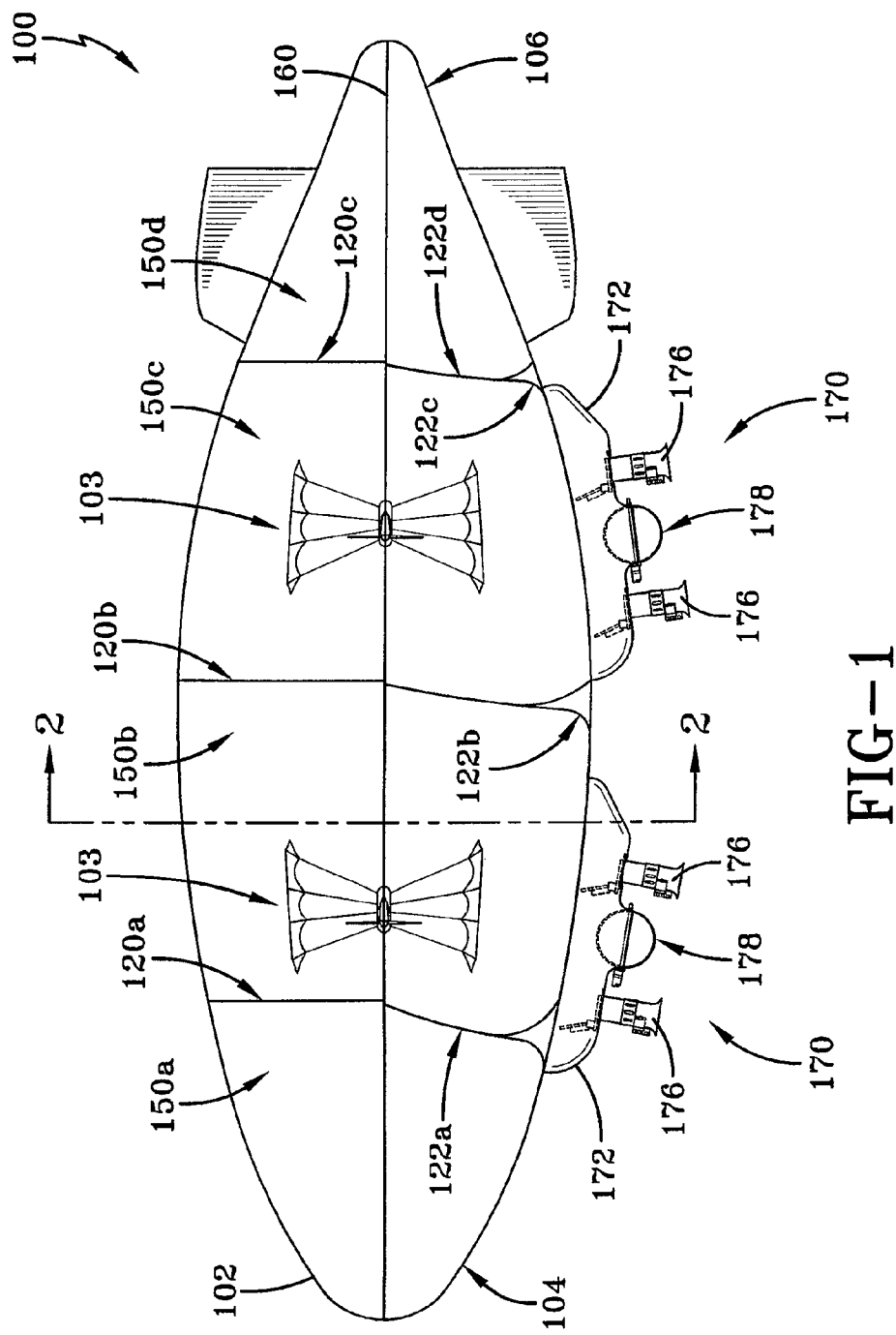
FIG. 1 shows an elevational view of a lighter-than-air vehicle having lifting gas cells and air cells, and means for filling them.

The air handling system of the present invention is attached to the hull and occupies a space or compartment outside of the hull. This means that it is not necessary to have a cage or protective system located inside the hull to protect the lifting gas envelope as it expands, and therefore there is the benefit of less weight for the airship. As shown in FIGS. 1 and 3, there are two air handling systems, with one located at the front of the airship and the other located near the rear. There is no criticality in the number or locations of the air handling systems, other than that they provide the function of filling and emptying the air envelope. Each air handling system will have at least one inlet port and an outlet valve, although they are presently shown with two inlet ports and one outlet valve. The air handling system 170 is joined to the hull 102. The container or enclosure 172 will preferably have an aerodynamic shape and be made of a structurally rigid material so as to not produce excess drag on the LTA. At least one reversible flow fan 174 having an inlet port 176 connects the air envelope 152 to ambient atmosphere and an outlet valve 178 is provided to allow the air in the air envelope to be released as the airship gains altitude and the lifting gas envelopes expand.

A valve 180 is located in the outlet port of the fan 174 for selectively allowing air to flow into the air envelope through the inlet port of the fan when the fan is in operation, but prevent air from exiting. The outlet valve is in the form of one or butterfly valves and is mounted on the surface of the enclosure 172 for venting air from the interior of the air envelope to ambient atmosphere.

A plurality of holes 182, 183, and 184 are provided and are in communication with the interior of the hull for filling and emptying the air envelope. The shape of the holes is not critical and can be circular or elliptical in shape.

The air handling system 170 can be joined to the hull by using a Vectran rope oval to reinforce the holes and the connection with the hull. The external container 172 can be connected to the main hull 102 by taping, sewing, lacing, or combination of these. The holes will provide a clear path and a continuous airspace between selected components for the air handling system, and thus reduce or eliminate flow restrictions. Equipment that could be connected are the air valves, blower and the fin duct. Thus the fins could be pressurized by the air handling system by providing and appropriate path from the air envelopes to the fins. Further, by using reversible fans in conjunction with valves, both rapid pressurization and filling and de-pressurizing and emptying of the air envelope is possible. When pressurizing, the electrical motor driven fans 174 are set to pump air into the air envelope and the check valves 180 are opened. When de-pressurizing, the valves 178 are opened.

The holes in the hull are large enough to provide adequate airflow. A large hole in a highly stressed hull will require reinforcement to carry hull loads. A large hole may require a mesh covering to prevent the helium filled adjacent lifting gas envelope 150 from passing through the hole. The use of a mesh covering would not only carry the hull loads to eliminate the need for other hole reinforcement, but it would also prevent the helium filled lifting gas envelope 150 from passing through the hole. Alternatively, there could be a series of small holes in the hull material.

The advantages of the subject air envelope system are numerous. First of all, by providing holes in the wall of the hull in conjunction with an external air handling system, large internal ducting coupling the fans to individual ballonets is eliminated saving weight and cost. Additionally, it allows the pressurization fans and vent valves to be positioned in very accessible locations allowing rapid repair or replacement.

Although the present invention is compatible with conventional airships, such as blimps, aerostats, or other lighter-than-air vehicles, the present discussion relates to its use with high altitude airships.

As best seen in FIGS. 2 and 4, the lifting gas cell system for use with a hull 102 for an airship 100 accommodates the expansion and contraction of the various gases that are disposed within the hull 102 to allow the airship 100 to ascend and descend while maintaining the structural integrity of the hull. Since the hull envelope 102 is formed from a flexible laminate material made to withstand operation at high altitudes and exposure to elements associated therewith, as well as to accommodate the expansion and contraction of the internal gases.

The operation of the lifting gas envelope system during an ascent and descent will now be discussed in detail. In FIG. 4 the hull 102 of the airship 100 containing the lifting gas cell system 100 is shown at ground level. Initially, the hull 102 is pressurized such that the air envelope 152 is filled with air and the lifting envelopes 150 are filled with a lighter-than-air gas so that the airship is buoyant at ground level. In this condition, the airship is moored to a ground station until ready for flight. The airship is then released and, during ascent, the air within the air envelope 152 will escape through the air handling system 170 to allow the lifting gas to expand. As a result of these combined events, the diaphragms 122$a$-$d$ transition from their position shown in FIG. 4. toward the lower extremity of the hull 102, as shown in FIG. 2.

To maintain proper pressure of the airship 104 during a descent, air is blown into the hull 102 using electric blowers 174. During this process the pressure of the air within the air cell 152 increases causing the diaphragms 122$a$-$d$ to traverse upwardly toward the upper extremity of the hull 102. Also because of the increased pressure exerted by the air envelope 152, the lifting gas disposed in each of the gas cells 150$a$-$d$ contracts facilitating the upward movement of the diaphragms 122$a$-$d$.

The diaphragm 122$b$ serves to separate the lifting gas contained in the gas cell 150$b$ from the air contained in the air envelope 152. Furthermore, the upward movement of the diaphragm 122$b$ increases the volume of the air envelope 152 while decreasing the volume of the gas cell 150$b$, thus allowing a large volume of air to be blown into the hull 102 during a descent of the airship.

It will be appreciated that the diaphragms should resist bunching and twisting to maintain the balance of the airship.

Although the invention has been described in detail with reference to particular examples and embodiments, the examples and embodiments contained herein are merely illustrative and are not an exhaustive list. Variations and modifications of the present invention will readily occur to those skilled in the art. The present invention includes all such modifications and equivalents. The claims alone are intended to set forth the limits of the present invention.

What we claim is:

1. An airship system, comprising:
   an inflatable airship having a hull of predetermined volume adapted to be filled with gas and to rise to a predetermined altitude, said hull formed from an inflated flexible gas containment primary envelope which forms a space therein;
   a plurality of propulsion systems mounted on said hull;
   a plurality of lifting envelopes located within the hull for containing the lifting gas, wherein said plurality of lifting envelopes expand to substantially occupy the space of the primary envelope when the hull is at its predetermined altitude;
   a single air envelope located within the hull, which can be inflated when said hull is at lower altitudes to substantially occupy the space of the primary envelope when the hull is at ground level; and
   at least one external air handling system attached outside of said inflatable airship, said at least one external air handling system moves air into and out of said single air envelope, said at least one air handling system comprising a reversible blower to move air into and out of said single air envelope as needed during ascent and descent of the airship system.

2. The airship system of claim 1 wherein said at least one external air handling system comprises:
   a container which extends outwardly from said inflatable airship; and
   a valve body which is integral with said container.

3. The airship system of claim 1 wherein said at least one external air handling system comprises a blower having an inlet for drawing air from the atmosphere and an outlet in communication with said single air envelope.

4. The airship system of claim 3 wherein the blower employs a check valve in the outlet in communication with said single air envelope to hold the air in said single air envelope.

5. The airship system of claim 1 wherein said at least one external air handling system comprises:
   a container which extends outwardly from said hull and has an aerodynamic shape.

* * * * *